US005284084A

United States Patent [19]

Pippert et al.

[11] Patent Number: 5,284,084

[45] Date of Patent: Feb. 8, 1994

[54] LIGHT WEIGHT PISTON

[75] Inventors: Frederick B. Pippert; John T. Rogers, both of Houston, Tex.

[73] Assignee: Utex Industries, Inc., Houston, Tex.

[21] Appl. No.: 794,348

[22] Filed: Nov. 12, 1991

Related U.S. Application Data

[63] Continuation of Ser. No. 642,405, Jan. 17, 1991, abandoned.

[51] Int. Cl.[5] ..... F16J 9/00

[52] U.S. Cl. ..... 92/241; 92/244; 92/253; 92/254

[58] Field of Search ..... 92/240, 241, 242, 243, 92/244, 245, 246, 248, 249, 253, 254, 194

[56] References Cited

U.S. PATENT DOCUMENTS

| | | | |
|---|---|---|---|
| Re. 27,382 | 5/1972 | Schlosser | 92/240 |
| 1,429,036 | 9/1922 | Iftiger | 92/240 |
| 1,828,056 | 10/1931 | Lamb | 92/244 |
| 2,063,724 | 12/1936 | Cater | 92/254 |
| 2,175,441 | 10/1939 | Miller | 92/244 |
| 2,413,751 | 6/1944 | Dennis | 91/454 |
| 3,155,014 | 11/1964 | Genz | 92/254 |
| 3,168,301 | 12/1960 | Allinquant | 92/240 |
| 3,317,409 | 3/1982 | Bottoms | 92/244 |
| 3,505,930 | 4/1970 | Schrader | 92/240 |
| 4,072,088 | 2/1978 | Goloff | 92/220 |
| 4,143,586 | 3/1979 | Zitting | 92/206 |
| 4,281,590 | 8/1981 | Weaver | 92/244 |
| 4,404,935 | 9/1983 | Kraft | 92/224 |
| 4,449,447 | 5/1984 | Yanagi | 92/248 |
| 4,515,378 | 5/1985 | Marshall | 92/245 |
| 4,516,481 | 5/1985 | Geffroy et al. | 92/212 |
| 4,601,235 | 7/1986 | Roberts | 92/245 |
| 4,735,129 | 4/1988 | Sjoberg | 92/240 |

FOREIGN PATENT DOCUMENTS

| | | |
|---|---|---|
| 3114286 | 4/1982 | Fed. Rep. of Germany . |
| 1462580 | 11/1966 | France . |
| 53-8453 | 1/1978 | Japan . |
| 53-38850 | 4/1978 | Japan . |
| 1413114 | 5/1975 | United Kingdom . |
| 2033537 | 5/1980 | United Kingdom . |
| 2045389 | 10/1980 | United Kingdom . |
| 698346 | 10/1983 | United Kingdom . |

OTHER PUBLICATIONS

Composite Catalog of Oil Field Equipment and Services, 1980–81 Edition, 34th revision, published by World Oil, pp. 5799, 5801, 5803, 5804, 5901, 5902, 7545, 6789.

*Primary Examiner*—Edward K. Look
*Assistant Examiner*—Hoang Nguyen
*Attorney, Agent, or Firm*—Browning, Bushman, Anderson & Brookhart

[57] ABSTRACT

A lightweight mud pump piston assembly for reciprocating inside of a cylinder. The piston has decreased weight because light weight materials are used to form the majority of the hub which is the heaviest part of the piston. The piston maintains its compressive strength because the critical stress portions of the hub are made with high strength material having higher tensile strength and density than the light weight material.

15 Claims, 4 Drawing Sheets

FIG. 1
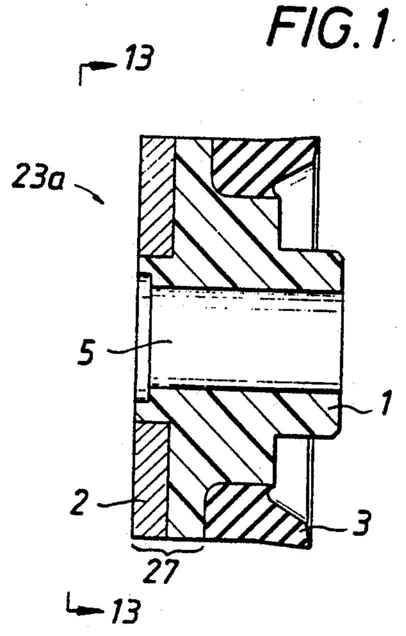
FIG. 2
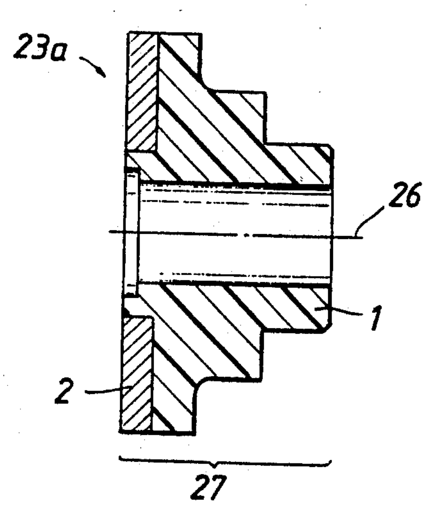
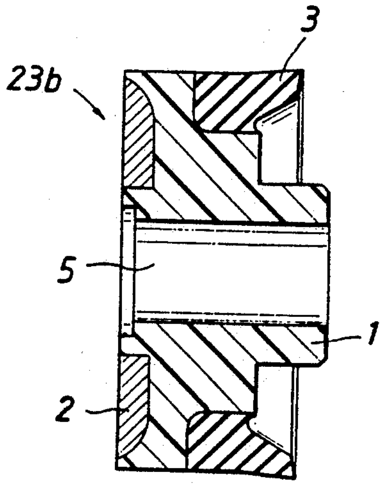
FIG. 3
FIG. 4
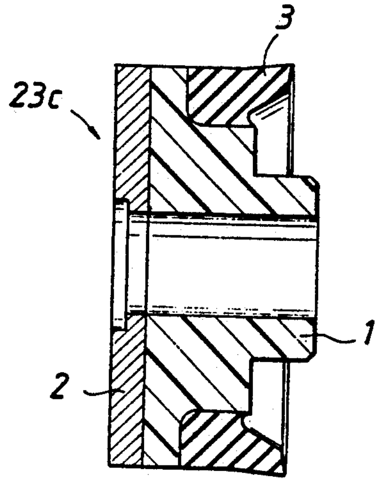
FIG. 5
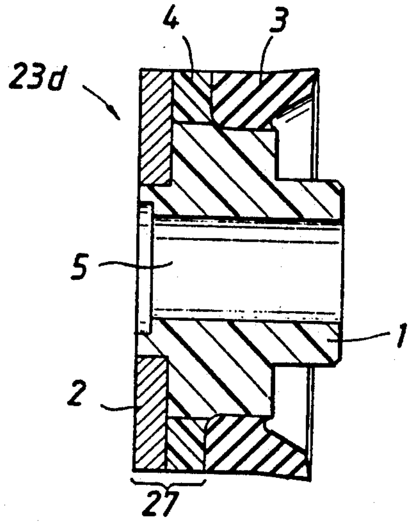

LIGHT WEIGHT PISTON

This is a continuation of co-pending U.S. application Ser. No. 07/642,405 filed Jan. 17, 1991, now abandoned.

BACKGROUND OF THE INVENTION

1. Field of the Invention

The present invention relates generally to piston assemblies, and more particularly, to a lightweight mud pump piston assembly.

2. Description of the Prior Art

Generally, mud pumps are used to pump slurry, mud solutions, oils, water and other fluids. In the oil field, mud pumps are often required to circulate drilling fluid through a borehole having a mud column thousands of feet in length. The internal pressures in the compression chambers of mud pump cylinders can often reach 2,000 pounds per square inch or more depending largely on the diameter of the bore of the mud pump cylinders and the depth of the well bore. Given a typical mud pump piston having a six inch diameter, a compression chamber pressure of 2,000 pounds per square inch results in a total force on the piston of approximately 56,000 pounds. This force is placed on the piston with each piston stroke.

In light of this heavy burden, the hub portion of the piston, which comprises the bulk of the piston assembly, has in the past been constructed out of high strength metals such as steel or similar metal alloys. Typical examples of solid steel hubs can be seen in U.S. Pat. No. 4,281,590.

Although such construction is quite suitable for handling the large force placed on the piston, this solution causes the piston assembly to have a substantial weight that exacerbates other problems which mud pumps have a tendency to experience.

Wear on the piston assembly and in the cylinder liner is one of the chief causes for downtime in a mud pump. A major cause of wear is the drilling fluid which is especially erosive when pumped at the high pressure and substantial volume that is required for drilling. The weight of the piston combined with the general wear of the cylinder liner resulting from the drilling fluid tends to create an unbalanced contact of the piston with the liner. Although the sealing elements which seal between the hub and the cylinder create a centralizing bias on the piston, this centralizing bias tends to be offset due to the effects of the weight of the piston. Furthermore, when the mud pump is positioned so that the cylinders are generally horizontal, the weight of the piston often results in greater contact of the piston on the bottom portion of the liner than the upper portion. These problems are further aggravated when the connecting rod to which the piston is secured is somewhat out of alignment due to bearing support wear or other pump problems.

These conditions generally cause an uneven wear pattern of the piston as well as the liner and, in some cases, will cause a metal to metal scouring of both the liner and any metal portion of the piston that may contact with the liner.

A number of pistons using light weight materials have been developed for various purposes. United Kingdom Patents 2,045,389 and 2,033,537 A show plastic pistons intended for use in air compressors. However, these snap on plastic pistons are designed for operating at much lower pressures than mud pump pistons and therefore do not suggest how it is possible to use such lightweight materials where the pressure demands on a piston are much greater.

U.S. Pat. Nos. 4,072,088 and 4,404,935 show how various lightweight and ceramic materials can be used to overcome problems specifically related to internal combustion engines such as heat and high revolutions per minute. These internal combustion pistons are generally shaped much differently than mud pump pistons and the problems these Patents address by using various lightweight materials are not subject to the same restraints in using light weight material in mud pumps. Therefore, these Patents do not suggest how it would be feasible, or even useful, to employ light weight materials in a mud pump piston.

Consequently, a need exists for improvements in piston assemblies which will result in greater reliability and dependability of operation of such assemblies.

SUMMARY OF THE INVENTION

The present invention provides a lightweight piston assembly designed to satisfy the aforementioned needs. The lightweight piston assembly of the present invention permits the piston to centralize itself more easily in the cylinder liner due to the centralizing bias effect of the sealing elements. Also wear on the lower portions of the cylinder liners which occurs when the pump cylinders are horizontal is decreased as a result of the decreased weight of the piston. The overall effect of the light weight piston assembly is a decrease in the occurrence of uneven wear patterns in the cylinder and the piston.

Even though pressures may range up to 5,000 pounds per square inch with high pressure rated smaller pistons (approximately 4 inch diameter), the hub of the piston assembly of the present invention is strong enough to carry the large forces applied to it. This is achieved without excessive distortion or fracturing despite the replacement of a relatively large percentage of the volume of steel or steel alloy in the hub with materials having a lower density or specific gravity than steel or steel alloy. Critical load bearing portions of the hub are constructed of materials having a higher tensile strength and having a greater density or specific gravity than the less dense materials which constitute the major portion of the hub. This combination of hub materials decreases the weight of the piston by as much as seventy percent depending on the piston size and design. In some piston designs, it is possible to reduce the presence of metal at the periphery of the piston so as to decrease metal to metal contact of the piston with the cylinder liner. Generally, the relatively lower density material will comprise between fifty-five and ninety percent of the volume of the hub. The percentage of the lower density material allowable will depend on the pressure rating of the piston assembly as well as its size and design. The higher density materials, in most designs, will constitute less than forty percent of the volume of the body. The lower density materials in the piston, for the most part, face the compression chamber of the cylinder while the higher density materials, which are usually shaped in the form of a disc or backing plate, are placed behind these lower density materials. This general technique allows the higher density materials to support the lower density materials with the greater tensile strength of the higher density materials.

BRIEF DESCRIPTION OF THE DRAWINGS

FIG. 1 is a side elevational view, in section, of the piston assembly of the present invention.

FIG. 2 is a side elevational view, in section, showing only the hub of the piston assembly of the present invention.

FIG. 3 is a side elevational view, in section, showing the backing plate of the piston projecting radially outward without reaching the outside diameter of the hub.

FIG. 4 is a side elevational view, in section, showing the backing plate of the present invention projecting radially outward from the hub inside diameter to the hub outside diameter.

FIG. 5 is a side elevational view, in section, showing the piston assembly of the present invention with a sealing means having a reinforcing anti-extrusion ring.

DETAILED DESCRIPTION OF THE PREFERRED EMBODIMENTS

Figure 6:
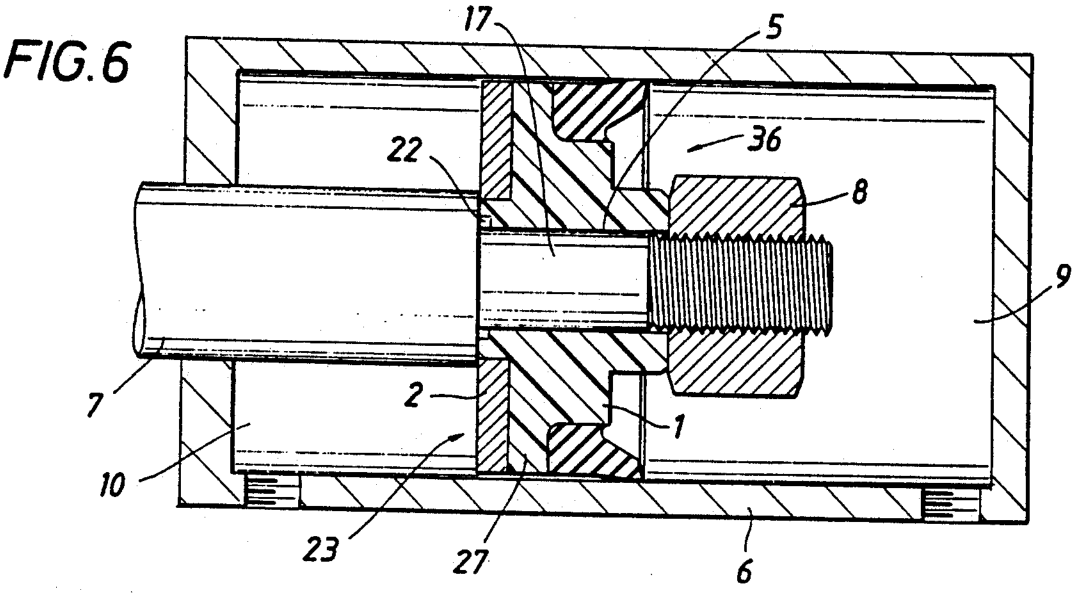
FIG. 6 is a side elevational view, in section, showing the piston assembly of the present invention inside a cylinder with a connecting rod.

Referring now to the drawings, and more particularly to FIG. 1, there is shown a sectional view of a piston, generally designated *23a*, according to the present invention. Hub 27 of piston *23a* is composed of body 1 bonded to backing plate 2. An annular flexible lip seal 3 is generally bonded to body 1 of hub 27. Body 1 is made of lightweight material to be described hereafter. Backing plate 2 is made from a high tensile strength metal also to be described hereafter. Bore 5 extends axially through piston *23a* to permit the piston to be secured to piston rod 7 (FIG. 6).

Referring to FIG. 2, body 1 is made of lightweight material and, in this design, has a volume including approximately seventy-five percent of the volume of the hub 27. Backing plate 2, of high tensile strength metal comprises about twenty-five percent of the volume of the hub. In this design, the axial length of body 1, i.e. the length of body 1 as measured by a line parallel to the axis of bore 5, is longer than the axial length of backing plate 2. The inside diameter of body 1 is less than the inside diameter of backing plate 2. Generally, the inside diameter of body 1 will be less than or equal to the inside diameter of backing plate 2. Likewise the axial length of body 1 will generally be longer than the axial length of backing plate 2.

Suitable materials for the critical load bearing backing plate 2 of hub 27 are steel, bronze, or various other metals or alloys. The tensile strength, quantity, and placement of these materials constituting the critical load bearing portions of the hub must necessarily be high enough to withstand pressures in the 5000–6000 pounds per square inch ranges acting on the piston without fracturing or distortion. Generally the pressure rating of the pistons will decrease as the diameter of the piston increases allowing for adjustments in the quantity or placement of this higher tensile strength material. Also if pressure rating requirements for a particular size piston are decreased as may occur because of the variety of types of mud pumps available, then the percentage of high tensile strength material may be decreased as well. Due to the higher tensile strength of materials comprising backing plate 2 as compared to the materials comprising the body 1, the backing plate 2 materials also have a higher density or specific gravity than the materials of which the body 1 is composed.

Body 1 of hub 27 is made of lightweight materials that may be thermosetting or thermoplastic in nature and substantially rigid to carry the compressive force applied to it. The compressive strength of these materials will generally allow compression with pressures ranging up to 5000 pounds per square inch (for smaller diameter pistons i.e. approx. 4 inch diameter) without fracturing or excessive distortion and assuming these materials are supported by high tensile strength materials which have, for practical purposes, no distortion at all under such pressures. The tensile strength of the lightweight materials will be less than that of the more dense high strength materials. The density or specific gravity of the lightweight materials is less than the density or specific gravity of the heavyweight materials thereby effecting a decrease in piston weight. This decrease in piston weight can be as much as seventy percent depending on the piston size and design. Examples of suitable lightweight materials are nylon, polyesters, epoxies, phenols, graphite compositions, as well as some of the natural or synthetic elastomeric materials as nitriles, silicon, natural rubber and the like, or combinations of the same. These may be homogeneous in nature, or reinforced with fabrics, fibers, filaments, etc., such as glass, cotton, graphite, aramid, nylon or a combination of such elements. Also, such lightweight metals or metal alloys as aluminum, magnesium, and the like may be used.

Flexible lip seal 3 is generally made from flexible materials of the elastomeric or resinous types such as but not limited to nitriles, styrene-butadiene polymer, neoprene, butyl, polyurethane, polyester, and the polyfluorocarbons.

FIG. 3 shows piston *23b* with backing plate 2 having an outside diameter less than the outside diameter of body 1. In piston *23b*, the likelihood of metal to metal contact between piston *23b* and pump cylinder liner 6, of FIG. 6, is decreased due to the relatively shorter radius of backing plate 2 as compared with the radius of body 1.

FIG. 4 shows piston *23c* having backing plate 2 with an outside diameter and inside diameter equal to that of body 1 or hub 27.

FIG. 5 shows piston *23d* having a support often known in the trade as an antiextrusion ring 4. Antiextrusion ring 4 is often made of hard plastics such as polyester material. It may also be made of fiber or fiber reinforced elastomeric materials or other suitable materials. Anti-extrusion ring 4 is generally bonded to the flexible lip seal 3. It may or may not be bonded to the hub 27 depending whether or not the combination of antiextrusion ring 4 and flexible lip seal 3 is a replaceable component of the piston 23.

FIG. 6 shows piston assembly 23 within pump cylinder liner 6 including connecting rod 7 bolted to hub 27 with bolt 8. An O-ring 22 is used to seal between connecting rod 7 and hub 27. Body 1 has one side as a compression chamber end 36 exposed to compression chamber 9 of pump cylinder 10 and backing plate 2 bonded to its opposite side.

Figure 7:
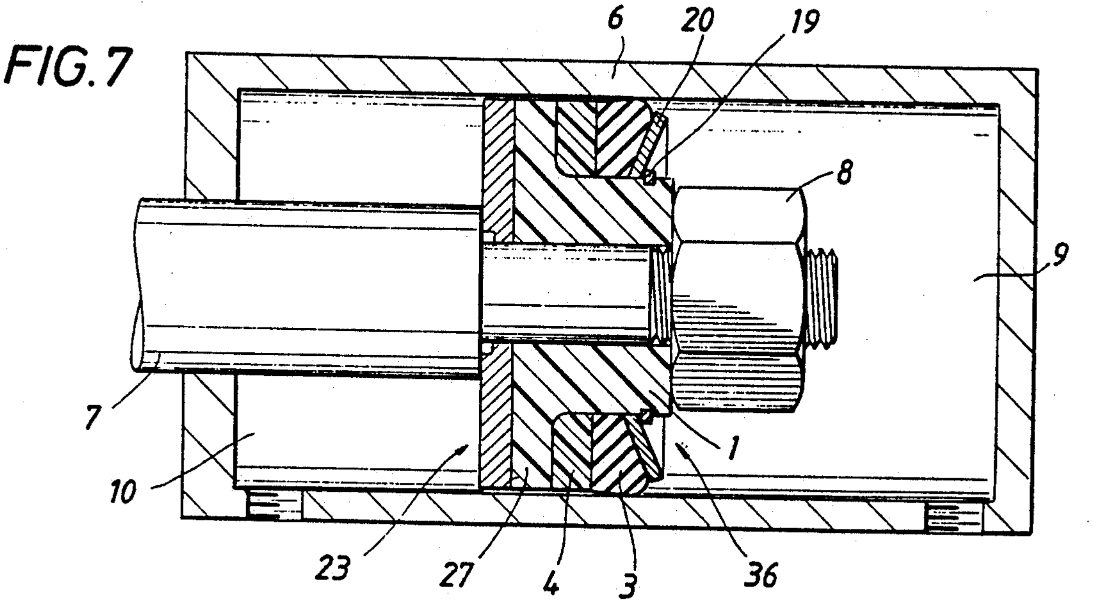
FIG. 7 is a side elevational view, in section, showing the piston assembly of the present invention with a removable lip seal and anti-extrusion assembly.

FIG. 7 shows piston assembly 23 within pump cylinder 10 which includes removable flexible lip seal 3 and anti-extrusion ring 4 assembly. Flexible lip seal 3 and anti-extrusion ring 4 are bonded together. They are held in place by snap ring 19 and end cover 20. It will be appreciated that many different methods exist in the art for attaching a flexible lip seal 3 and anti-extrusion ring 4 assembly to the hub 27. FIG. 7 merely shows one such method of attachment.

Figure 8:
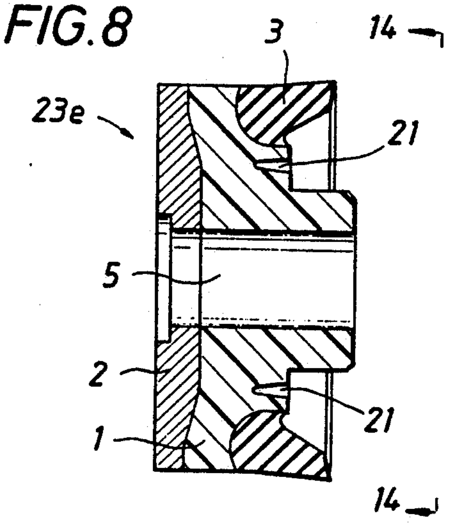
FIG. 8 is a side elevational view, in section, showing a piston of the present invention having a notch in the body of the hub.
Figure 14:
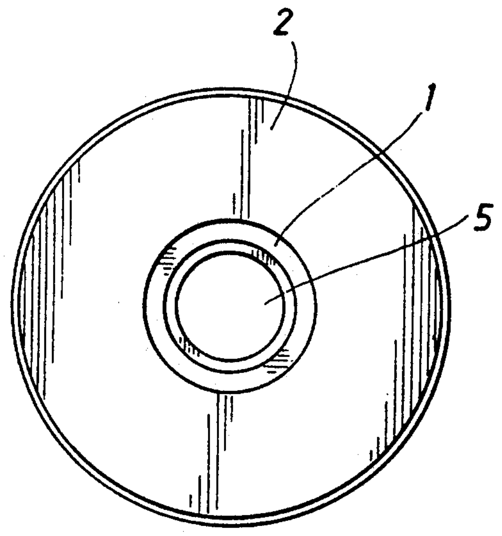
FIG. 14 is a top view of a piston according to the invention along the lines of 14—14 of FIG. 8.
Figure 13:
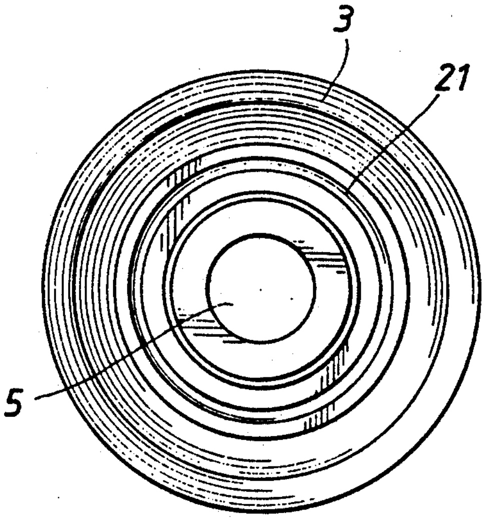
FIG. 13 is a bottom view of a piston according to the invention along the lines 13—13 of FIG. 1.

FIGS. 8 and 14 shows piston **23*e* having body 1 with notch 21. Notch 21 can be used to make body 1 radially flexible in some designs. This radial flexibility adds to the flexibility of lip seal 3 which, in some applications, will provide a better seal between hub 27 and cylinder liner 6. Lip seal 3** may have various angles of contact or shape depending on the general applications.

Figure 9:
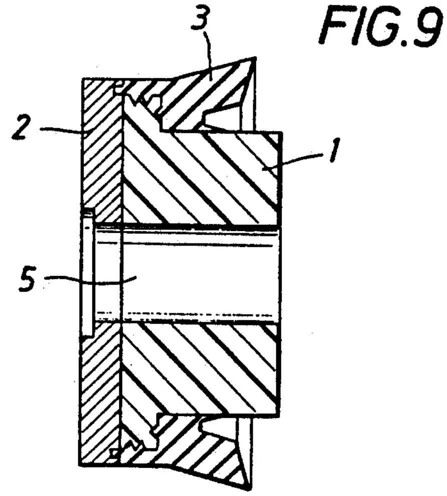
FIG. 9 is a side elevational view, in section, showing piston assembly of the present invention having a lip seal extending to the backing plate.

FIG. 9 shows lip seal 3 extending to backing plate 2. In this design, the backing plate 2 provides direct support to lip seal 3. Body 1, lip seal 3, and backing plate 2 are bonded together.

Figure 10:
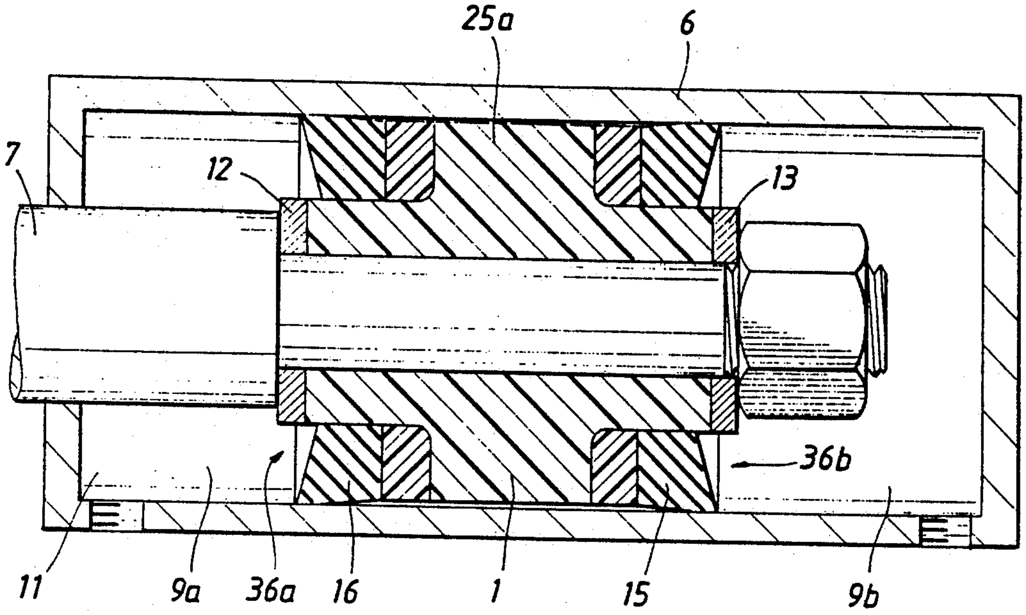
FIG. 10 is a side elevational view, in section, showing a double acting piston assembly of the present invention with three backing plates.

FIG. 10 shows double acting piston **25*a* for use in a duplex cylinder 11 having two compression chambers 9*a*, 9*b*. Each side of body 1 now faces either compression chamber 9*a* or 9*b* and therefore body 1 has two compression chamber ends 36*a* and 36*b*. Bonded to each face of body 1 are backing plates 12 and 13. Two flexible lip seals 15,16 are needed to seal piston 25*a*** because it compresses as it moves in both directions in this arrangement.

Figure 11:
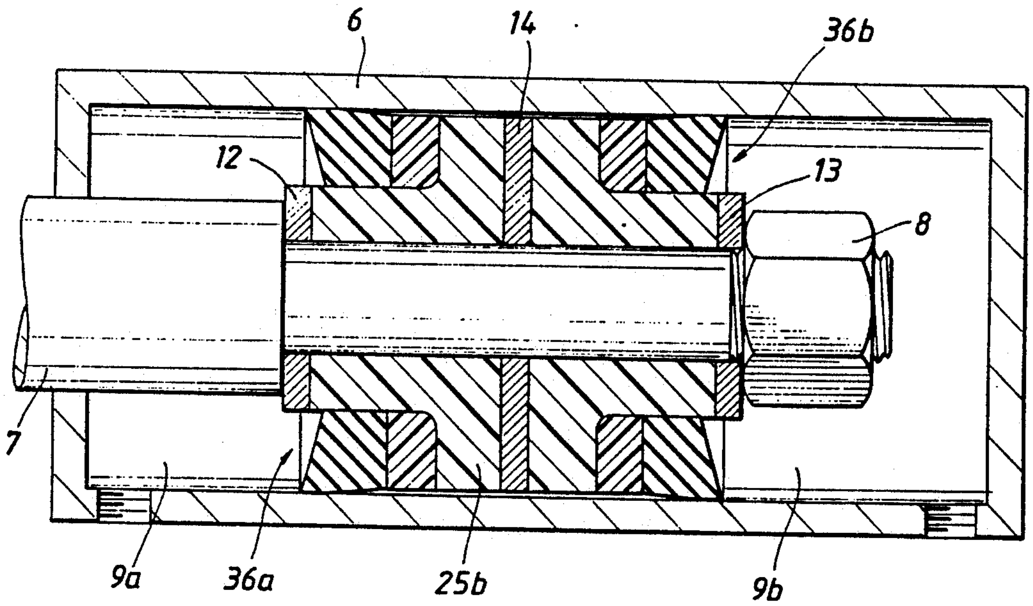
FIG. 11 is a side elevational view, in section, showing a double acting piston of the present invention with three backing plates.

FIG. 11 shows double acting piston **25*b* including three backing plates 12,13,14 bonded to body 1. Backing plate 14 is located centrally in body 1. Backing plate 14 may or may not extend to the outside diameter of double acting piston 25*b*. In the design wherein backing plate 14 does not extend to cylinder liner 6**, there is less chance of metal to metal contact.

Figure 12:
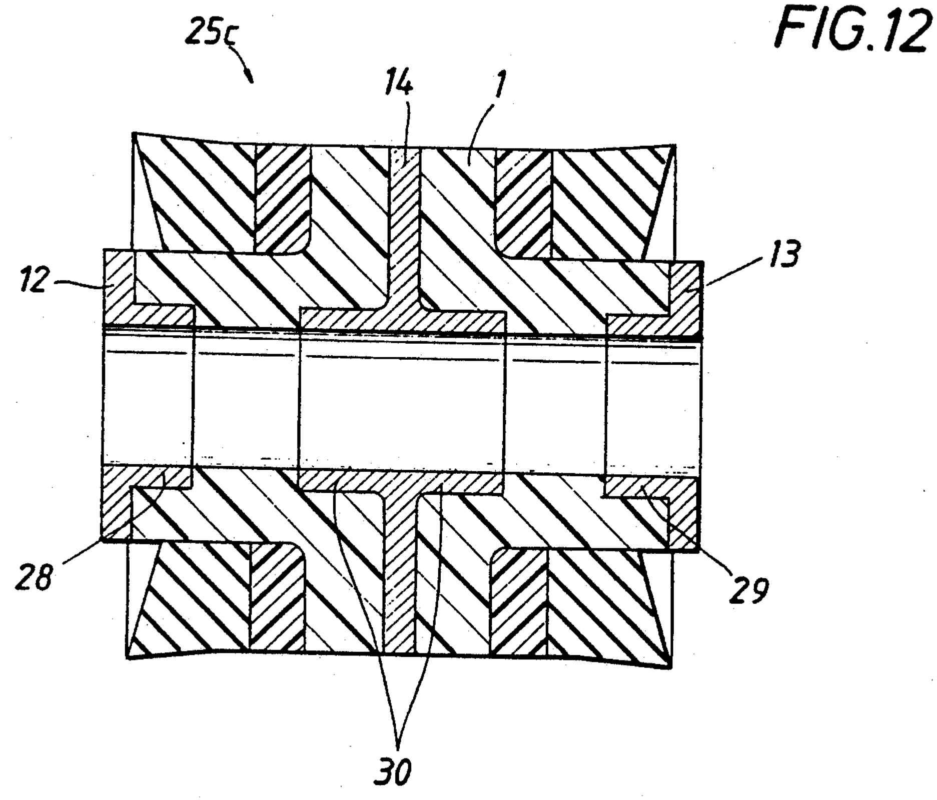
FIG. 12 is a side elevational view, in section, showing a double acting piston of the present Invention with three backing plates each of which include a cylindrical portion.

FIG. 12 shows double acting piston **25*c* for use in a duplex cylinder 11 (see FIG. 11). Double acting piston 25*c* has three backing plates 12, 13, 14 wherein tubular portions 28, 29, 30 are included as a part of the backing plate structures. The tubular portions 28, 29, and 30 do not extend through the entire axial length of double acting piston 25. Backing plate 12 including tubular portion 28 has an axial length less than 25% of the axial length of piston 25*c*. Similarly backing plate 13 including tubular portion 29 has an axial length less than 25% of the axial length of piston 25*c*. Backing plate 14 is located centrally with respect to attached tubular portion 30. Backing plate 14 including tubular portion 30 has an axial length less than 50% of the axial length of piston 25*c***.

Although the present invention was developed for use with mud pumps, it is adaptable for use in various types of mechanisms having piston assemblies reciprocating in cylinders.

It is thought that the lightweight piston assembly and many of its attendant advantages will be understood from the foregoing description and it will be apparent that various changes may be made in the form, construction, and arrangement of the parts thereof without departing from the spirit and scope of the invention or sacrificing all of its material advantages, the forms hereinbefore described being merely preferred or exemplary embodiments thereof.

What is claimed is:

1. A lightweight mud pump piston for reciprocating inside of a cylinder, said piston comprising:

a. a hub, said hub having a volume, said hub comprising:

a radially projecting annular backing plate, said backing plate having an axial length, said backing plate being composed of a first material, said backing plate extending radially outward so that it has an outside diameter substantially equivalent to a corresponding outside periphery of said hub;

an annular cylindrically symmetrical body, said body having a volume equal to between fifty-five and eighty-five percent of said hub volume, said body being composed of a second material, said body having a first compression chamber end and a second end opposite said first end, said backing plate being bonded to said second end of said body so that said backing plate is concentrically positioned with respect to said body, said first material of said backing plate having a tensile strength and a density greater than the tensile strength and density of said second material of said body; and b. a lip seal, said lip seal being disposed around a portion of said hub so that said lip seal forms a seal between said hub and said cylinder, said piston being rated for compression pressures of at least three thousand pounds per square inch, said lip seal being bonded to said body so as to form a single unit piston, said single unit piston having a first leading end with an annular groove formed therein.

2. A lightweight piston assembly as recited in claim 1, including:

said body having an axial length, said axial length of said body being larger than the axial length of said backing plate.

3. A lightweight piston assembly as recited in claim 1, including:

said hub having a bore extending axially through said hub, said backing plate having an inside diameter, said body having an inside diameter, said inside diameter of said body being less than or equal to said backing plate inside diameter.

4. A lightweight piston assembly as recited in claim 1, further including:

said backing plate having a volume, said backing plate volume comprising less than fifty-five percent of said hub volume.

5. A lightweight piston assembly as recited in claim 1, further including:

a. said hub having a bore extending axially through said hub, said hub having an inside diameter and an outside diameter; and b. said backing plate extending radially outward from said inside hub diameter to said outside hub diameter.

6. A lightweight piston assembly as recited in claim 1, further including:

a. said hub having a bore extending axially through said hub, said hub having an inside diameter and an outside diameter; and b. said backing plate extending radially outward from said inside hub diameter towards said outside hub diameter but not reaching said outside hub diameter.

7. A lightweight piston assembly as recited in claim 1, further including:

a. said hub having a bore extending axially through said hub, said hub having an inside diameter and an outside diameter; and b. said backing plate extending radially inward from said hub outside diameter toward said hub inside diameter but not reaching said hub inside diameter.

8. A lightweight piston assembly as recited in claim 1, further including:

a. said hub having a bore extending axially through said hub, said hub having an inside diameter and an outside diameter; and b. said backing plate extending radially between said inside and outside hub diameters but not extending to either said hub inside diameter or said hub outside diameter.

9. A lightweight piston assembly as recited in claim 1, including:

an anti-extrusion ring, said anti-extrusion ring being bonded to said lip seal.

10. A lightweight piston assembly as recited in claim 1, wherein:

said lip seal extends to said backing plate.

11. A lightweight piston assembly as recited in claim 1, wherein: said piston has a bore extending axially through said piston.

12. A lightweight piston assembly as recited in claim 1, wherein: said hub and said lip seal are bonded together.

13. A lightweight piston assembly as recited in claim 12, further including: an anti-extrusion ring, said anti-extrusion ring being bonded together with said hub and said lip seal.

14. A lightweight mud pump piston assembly for reciprocating inside of a cylinder, said piston assembly comprising:

a. a hub, said hub having a volume, said hub comprising:

first, second, and third radially projecting annular backing plates, said backing plates having an axial length, said backing plates being composed of a first material, an annular cylindrically symmetrical body, said body having a volume equal to between fifty-five and eighty-five percent of said hub volume, said body being composed of a second material, said body having two compression chamber ends so that said body has first and second compression chamber ends, said first backing plate being bonded concentrically to said first compression chamber end of said body and said second backing plate being bonded concentrically to said second compression chamber end of said body, said third backing plate being located centrally within said body and being bonded to said body, said first and second backing plates each including an annular tubular portion, each of said first and second backing plates with said annular tubular portions having an axial length less than one fourth of the axial length of said body, said third backing plate including an annular tubular portion, said axial length of said third backing plate including said tubular portion having an axial length less than one half of the axial length of said body, said first material of said backing plates having a tensile strength and a density greater than the tensile strength and density of said second material of said body; and b. a lip seal, said lip seal being disposed around a portion of said hub so that said lip seal forms a seal between said hub and said cylinder, said piston assembly being rated for compression pressures of at least fifteen hundred pounds per square inch, said lip seal and said first, second and third backing plates and said body being bonded together to form a single unit.

15. A lightweight piston assembly as recited in claim 14, including:

(a) a plurality of anti-extrusion rings, each of said anti-extrusion rings being bonded to each of said lip seals.

* * * * *